United States Patent [19]

Ishii

[11] Patent Number: 5,740,539
[45] Date of Patent: Apr. 14, 1998

[54] CALLING SYSTEM USING MOBILE TELEPHONE TERMINAL WITH LOCATION MONITORING

[75] Inventor: Katsuhiro Ishii, Tokyo, Japan

[73] Assignee: NEC Corporation, Tokyo, Japan

[21] Appl. No.: 647,691

[22] Filed: May 13, 1996

[30] Foreign Application Priority Data

May 12, 1995 [JP] Japan .................................. 7-138607

[51] Int. Cl.⁶ .................................................. H04Q 7/38
[52] U.S. Cl. .......................................................... 455/456
[58] Field of Search ....................................... 455/456, 422

[56] References Cited

FOREIGN PATENT DOCUMENTS

| 193316 | 2/1986 | European Pat. Off. . |
|--------|--------|----------------------|
| 520194 | 5/1992 | European Pat. Off. . |
| 57-53161 | 3/1982 | Japan . |
| 2-155319 | 6/1990 | Japan . |
| 2251359 | 12/1991 | United Kingdom . |

*Primary Examiner*—William Cumming
*Attorney, Agent, or Firm*—Ostrolenk, Faber, Gerb & Soffen, LLP

[57] ABSTRACT

A calling system includes radio zones, a mobile telephone terminal, a paging terminal unit, a central control unit, and a notifying section. Each radio zone includes a control unit, a memory unit, a relay station, and calling units. The mobile telephone unit determines a response disabled state of a callee and transmits the corresponding information to the control unit. The main control unit has a main memory unit. The notifying section notifies information indicating the absence of the callee to the control unit, the mobile telephone terminal, and the caller. The position information of the paging terminal unit is sequentially registered in the memory unit, the control unit or the central control unit searches for the paging terminal unit in cooperation with the memory unit or the main memory unit when the callee cannot respond to the incoming call, and when the paging terminal unit is detected, the paging terminal unit is called at a position where the paging terminal unit is detected, and the callee is called via at least one of the calling units which is arranged in the radio zone corresponding to the position where the paging terminal unit is detected.

6 Claims, 7 Drawing Sheets

FIG. 10

| $S_1$ | $S_2$ | $S_3$ | |

FIG. 11

| $S_1$ | $S_2$ | $S_3$ | $S_4$ | |

CALLING SYSTEM USING MOBILE TELEPHONE TERMINAL WITH LOCATION MONITORING

BACKGROUND OF THE INVENTION

1. Field of the Invention

The present invention relates to a calling system using a mobile telephone terminal such as a mobile cellular phone and, more particularly, to a calling system in which a private area as a call range is constituted by a plurality of radio zones, and a mobile telephone terminal itself detects a termination disabled state to transfer information indicating the detected state to a callee in a specific radio zone within the private area.

2. Description of the Prior Art

As a conventional calling system of this type, a mobile telephone system having a mobile station apparatus constituted by a mobile station such as a vehicle telephone and a mobile telephone terminal is disclosed in Japanese Unexamined Patent Publication No. 2-155319. In this system, each mobile station has a cordless master telephone function, in addition to a general vehicle telephone function, to serve as a relay station so as to allow connection and speech communication to a mobile telephone terminal even in a place remote from the mobile station. That is, the system is designed to allow user to perform a calling operation and speech communication by a simple method (carrying a cordless subsidiary telephone set with him/her in practice) even in places remote from the mobile stations.

Japanese Unexamined Patent Publication No. 57-53161 discloses a vehicle telephone switching scheme in which when a callee cannot respond to an incoming call to a vehicle telephone terminal because he/she is out, the callee is called by paging, and the caller is informed of this state, thereby allowing termination of the call.

However, the following problems are posed in the above prior arts.

First, in the system disclosed in Japanese Unexamined Patent Publication No. 2-155319, when a callee is not carrying a terminal upon reception of an incoming call, he/she cannot obtain terminating information. This is because terminating information is exchanged only between the mobile station and the terminal.

Second, in the scheme disclosed in Japanese Unexamined Patent Publication No. 57-53161, a callee cannot respond to an incoming call from a caller. This is because the paging terminal unit is a dedicated terminating unit having no originating function.

SUMMARY OF THE INVENTION

It is, therefore, an object of the present invention to provide a calling system using a mobile telephone terminal such as a mobile cellular phone, which can solve the above problems, realize a reliable calling operation in a terminating operation, and improve reliability in speech communication.

In order to achieve the above object, according to the basic aspect of the present invention, there is provided a calling system using a mobile telephone terminal such as a cellular telephone, comprising a plurality of radio zones, each including a control unit, a memory unit which cooperates with the control unit, a relay station, and a plurality of calling units, and belonging to a private area as a call range, a mobile telephone terminal for determining a response disabled state of a callee with respect to an incoming call by measuring a time from generation of a terminating request, and transmitting, via the relay station, information indicating the response disabled state to the control unit arranged in a radio zone in which the terminating request is received, a central control unit having a main memory unit to control each of the relay stations arranged in the plurality of radio zones via the control unit, and means for notifying information indicating an absence of a callee from the central control unit to the control unit, and/or from the control unit to the mobile telephone terminal via the relay station, and further notifying the information from the mobile telephone terminal to the caller via a base station which has received a terminating request signal from the mobile telephone terminal, wherein position information of the paging terminal unit is sequentially registered in the memory unit, the control unit or the central control unit searches for the paging terminal unit in cooperation with the memory unit or the main memory unit when the callee cannot respond to the incoming call, and when the paging terminal unit is detected, the paging terminal unit is called at a position where the paging terminal unit is detected, and the callee is called via at least one of the calling units which is arranged in the radio zone corresponding to the position where the paging terminal unit is detected.

Preferably, according to the present invention, if the paging terminal unit is detected in the radio zone in which the mobile telephone terminal is present when the control unit searches the memory unit cooperating with the control unit, the paging terminal unit is called, and the callee is called via at least one of the calling units which is arranged in the radio zone corresponding to a position where the paging terminal unit is detected.

Preferably, according to the present invention, if the paging terminal unit is not detected in the radio zone in which the mobile telephone terminal is present when the control unit searches the memory unit cooperating with the control unit, the central control unit cooperates with the main memory unit to search for another radio zone whose position is registered in the main memory unit, and if another radio zone is detected, the paging terminal unit positioned in the another radio zone is called, and the callee is called via at least one of the calling units which is arranged in the another radio zone.

In addition, in the present invention, the calling unit according to the basic aspect is preferably sound calling means and/or signboard display unit.

Furthermore, according to the basic aspect of the present invention, the paging terminal unit preferably comprises means for notifying the relay station of selection information in accordance with selection of the callee which represents whether the callee responds to a terminating request to the mobile telephone unit.

Moreover, according to the basic aspect of the present invention, response disabled state information transferred to the mobile telephone unit via the relay station and the control unit is preferably notified to the caller via the sound output means and/or the display output means.

As is understood from the above aspects, according to the present invention, even if an incoming call is received when the callee is not carrying the motile telephone terminal, the callee can quickly respond to the call.

In addition, according to the present invention, since the signboard unit or the sound calling unit is used to notify the third party that the callee is being called, a more reliable, quick response can be expected from the callee.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

BRIEF DESCRIPTION OF THE DRAWINGS

FIG. 10 is a view showing an example of the signal format of a radio signal transmitted from a relay station to a paging terminal 8; and FIG. 11 is a view showing an example of the signal format of a radio signal transmitted from the paging terminal 8 to the relay station.

DETAILED DESCRIPTION OF THE PREFERRED EMBODIMENT

Figure 1:
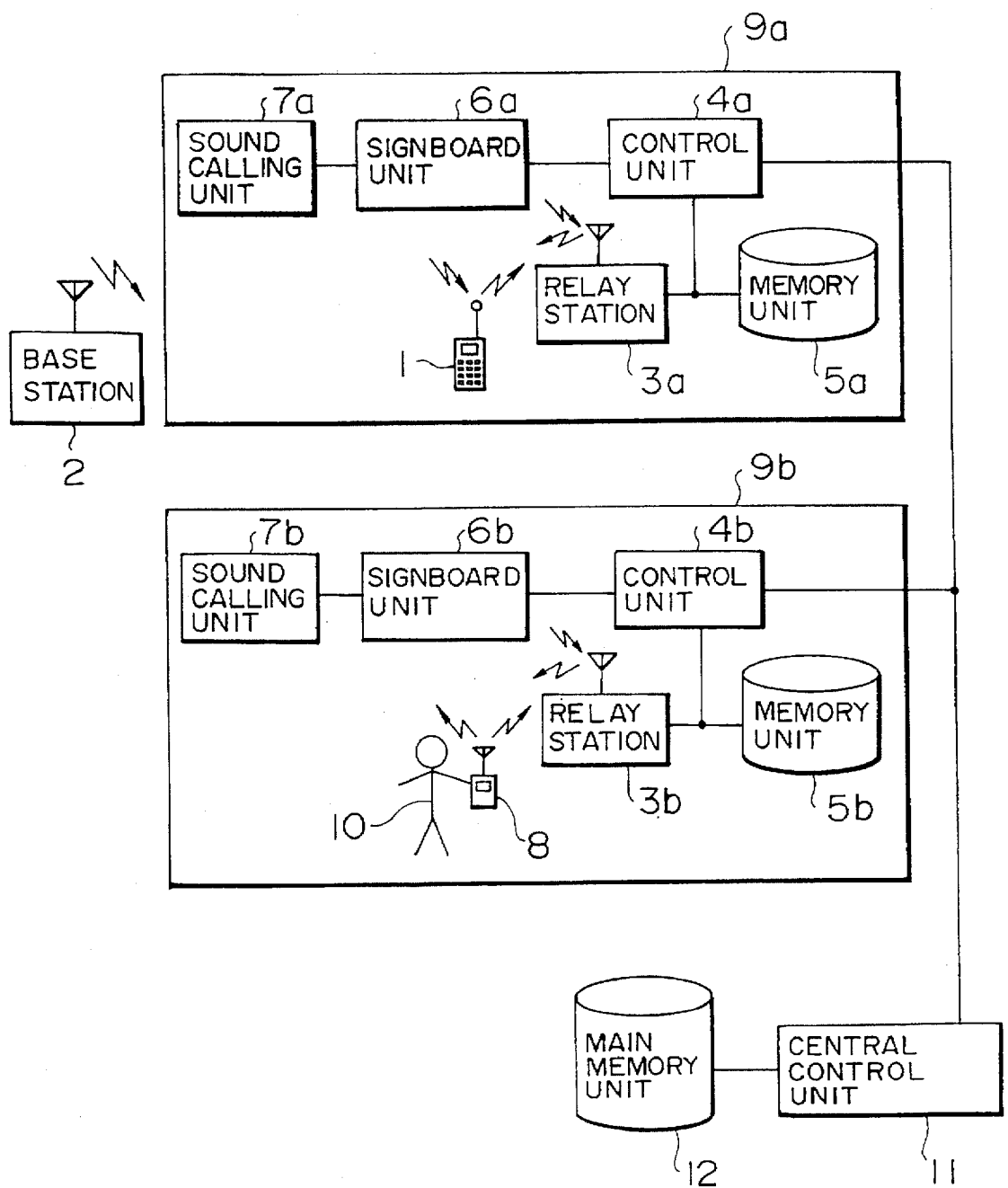
FIG. 1 is a block diagram for explaining an example of an embodiment of the present invention.

FIG. 1 is a schematic view for explaining the overall arrangement of an embodiment of the present invention. As shown in FIG. 1, according to this embodiment, in a calling system using a mobile telephone terminal such as a mobile cellular phone, a private area as a calling range is constituted by a plurality of radio zones 9a and 9b. A relay station 3a, a control unit 4a, a memory unit 5a, and a plurality of calling units 6a and 7a are present in the radio zone 9a. Each control unit is connected to a central control unit 11 via a wire or radio transmission channel. A main memory unit 12 is connected to the central control unit 11. The other radio zone 9b has the same arrangement as described above. A callee 10 is carrying a bidirectional paging terminal unit (to be simply referred to as a paging terminal unit hereinafter) 8 capable of transmitting/receiving information.

Figure 4:
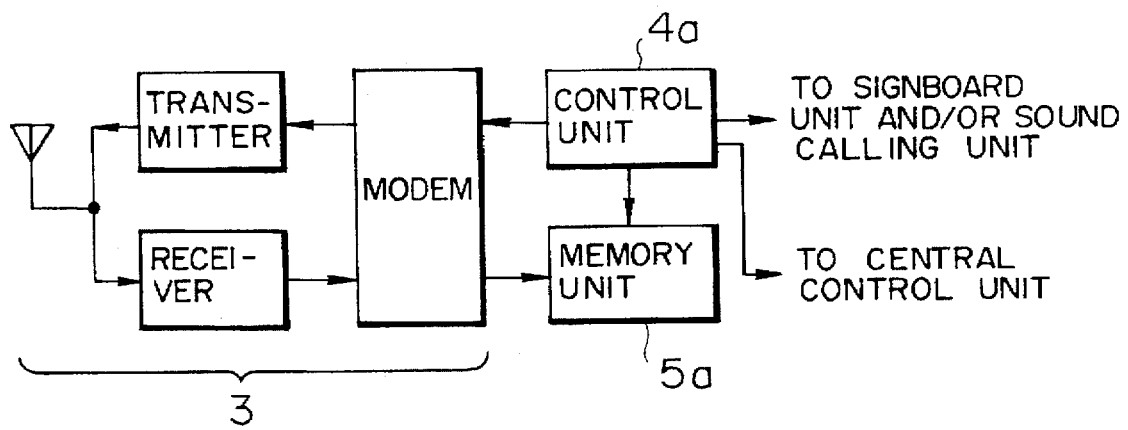
FIG. 4 is a block diagram showing an example of the arrangement of a relay station, a control unit, and a memory unit used in the embodiment of the present invention.
Figure 5:
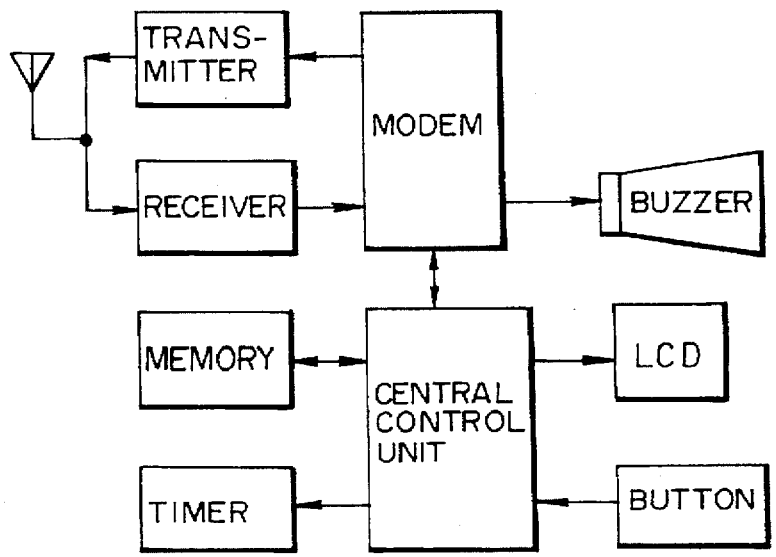
FIG. 5 is a block diagram showing an example of the arrangement of a paging unit used in the embodiment of the present invention.

FIG. 4 shows the arrangement of the relay station 3a, the control unit 4a, and the memory unit 5a. FIG. 5 shows an example of the internal arrangement of the paging terminal unit 8.

Figure 6:
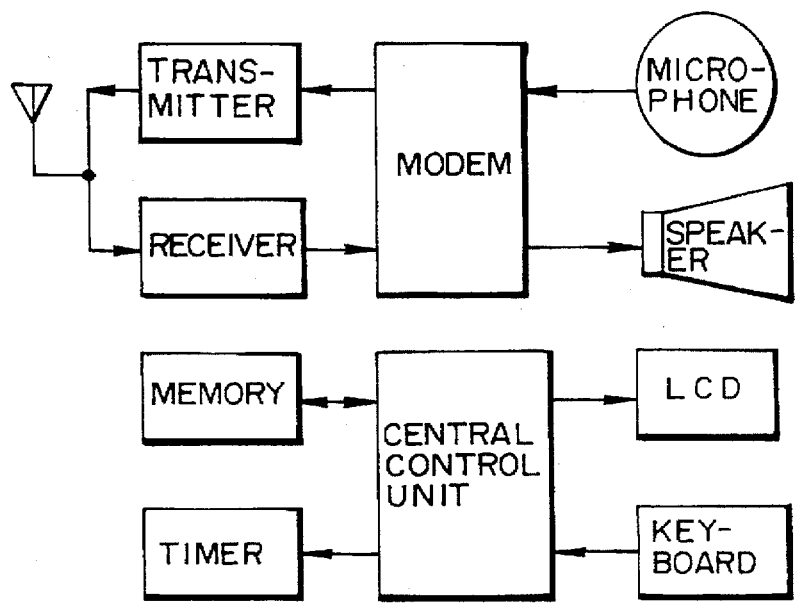
FIG. 6 is a block diagram showing an example of the arrangement of a mobile telephone terminal used in the embodiment of the present invention.
Figure 7:
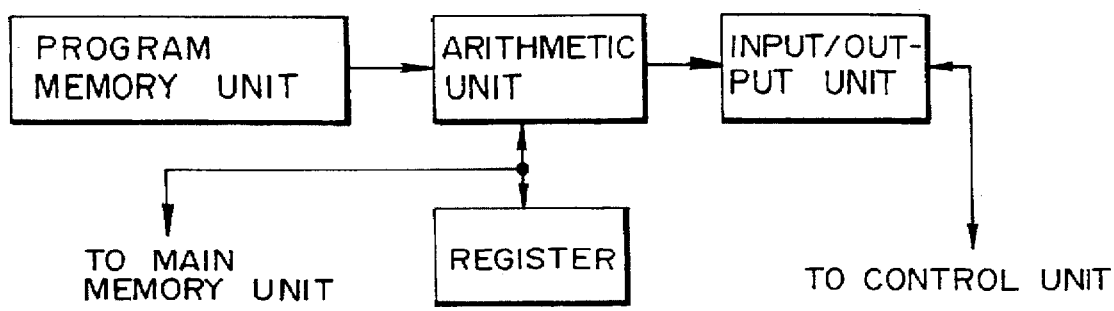
FIG. 7 is a block diagram showing an example of the arrangement of a central control unit used in the embodiment of the present invention.

Assume that a mobile telephone terminal 1 (an example of the internal arrangement is shown in FIG. 6) is in a called state, but the callee cannot immediately respond to the incoming call, as shown in FIG. 1. In this case, the control unit 4a cooperates with the central control unit 11 (an example of the internal arrangement is shown in FIG. 7) to inform the callee of the called state of the mobile telephone terminal 1 by using the calling units 6a and 7a and the paging terminal unit 8 capable of transmitting/receiving information.

Since a calling operation for the callee is performed by a plurality of methods, even if the callee is not carrying the paging terminal unit 8, he/she can recognize that a terminating request is generated with respect to the mobile telephone terminal 1.

If the callee is carrying the paging terminal unit 8 capable of transmitting/receiving information, a control unit 4b cooperates with the central control unit 11 to transmit information indicating whether he/she will respond to the terminating request to the mobile telephone terminal 1, thereby realizing a more reliable terminating operation.

Figure 2:
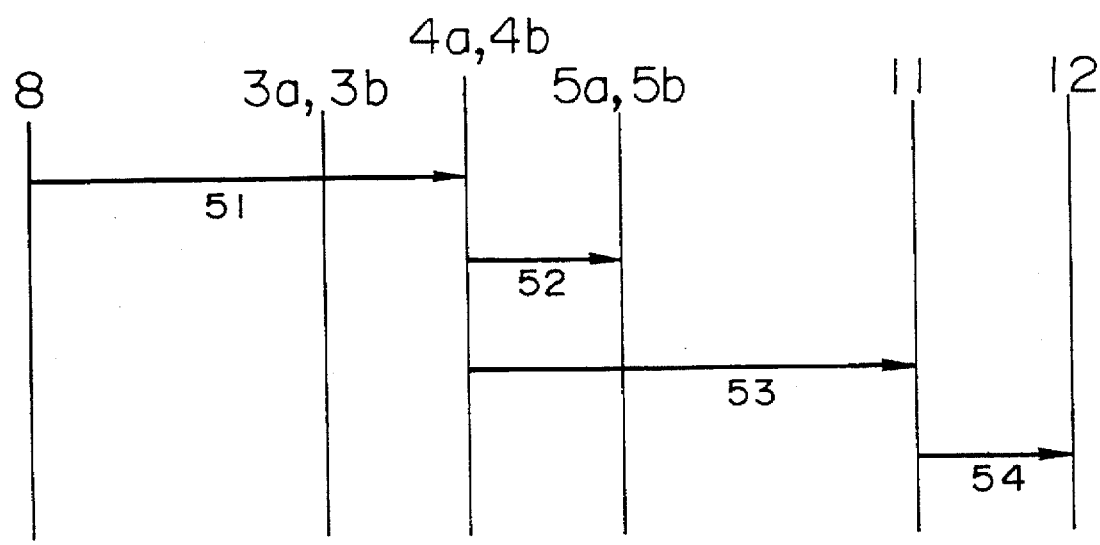
FIG. 2 is a view showing a sequence to explain a position registering operation of a paging terminal unit in the embodiment of the present invention.
Figure 3:
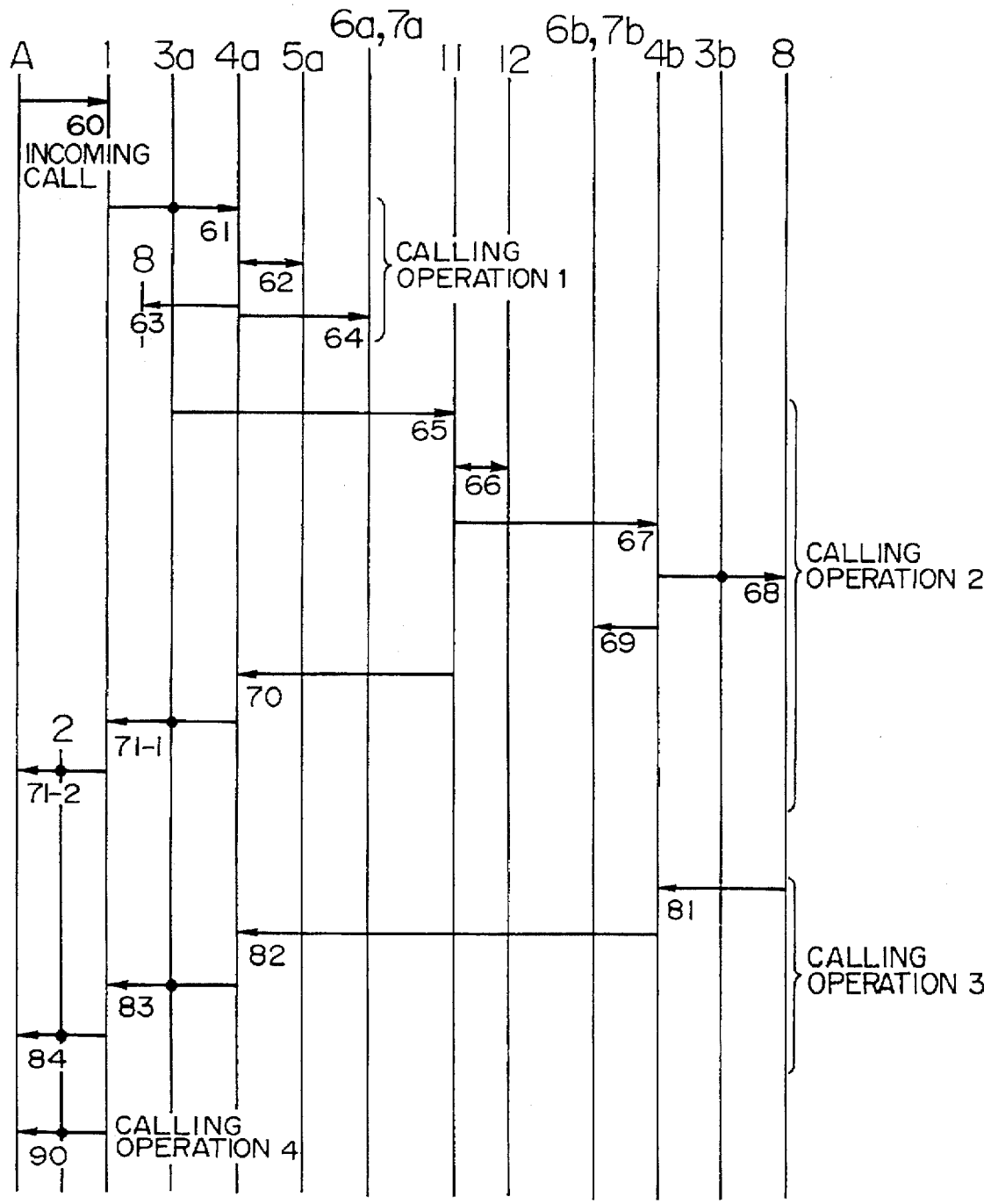
FIG. 3 is a view showing a sequence to explain a calling operation and a responding operation of the paging terminal unit in the embodiment of the present invention.

A preferred embodiment of the present invention will be described below with reference to the accompanying drawings. FIG. 1 is a block diagram for explaining an embodiment of the present invention. FIG. 2 is a view showing a sequence to explain a position registering operation of the paging terminal unit 8 in this embodiment. FIG. 3 is a view showing a sequence to explain a calling operation and a responding operation of the paging terminal unit 8.

A position registering operation of the paging terminal unit 8 in this embodiment will be described first with reference to FIGS. 1 and 2.

In the calling system using the mobile telephone terminal 1 in FIG. 1, the paging terminal unit 8, which is capable of transmitting/receiving information and is carried by the callee 10, transmits the name of the callee 10 or corresponding information as radio waves at predetermined intervals.

The control units 4a and 4b installed in the radio zones 9a and 9b always detect the radio waves transmitted from the paging terminal unit 8 through the relay station 3a and a relay station 3b.

When the control unit 4a or 4b receives information from the paging terminal unit 8 via the relay station 3a or 3b (step 51 FIG. 2), the control unit 4a or 4b stores a name or corresponding information obtained from the paging terminal unit 8 in the memory unit 5a or 5b (step 52 in FIG. 2).

The control unit 4a or 4b simultaneously transmits its identification information and the name of the callee 10 or the corresponding information obtained from the paging terminal unit 8 to the central control unit 11 (step 53 in FIG. 2).

The central control unit 11 stores the information transmitted from the control unit 4a or 4b in the main memory unit 12 (step 54 in FIG. 2).

A calling operation in the above embodiment will be described next with reference to FIGS. 1 and 3.

In this embodiment, the mobile telephone terminal 1 in the radio zone 9a as the call range receives a terminating request signal from the caller A via a base station 2 (step 60 in FIG. 3).

Calling Operation 1:

If a ringing tone is generated a predetermined number of times or more (a predetermined period of time or more elapses after the generation of the terminating request), the mobile telephone terminal 1 notifies the control unit 4a via the relay station 3a that the callee 10 cannot respond to the incoming call because, for example, he/she is out (step 61 in FIG. 3).

The control unit 4a refers to the memory unit 5a to check whether the paging terminal unit 8 indicating the callee 10 is present in the radio zone 9a, i.e., a position registering operation has been performed (step 62 in FIG. 3).

If the position registering operation has been performed (i.e., the paging terminal unit 8 is present in the radio zone in which the mobile telephone terminal 1 is present), the control unit 4a calls the paging terminal unit 8 via the relay station 3a (step 63 in FIG. 3).

Figure 8:
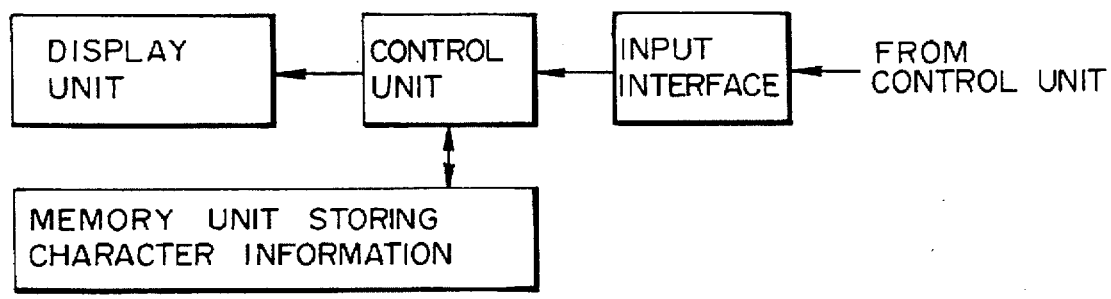
FIG. 8 is a block diagram showing an example of the arrangement of a signboard unit used in the embodiment of the present invention.
Figure 9:
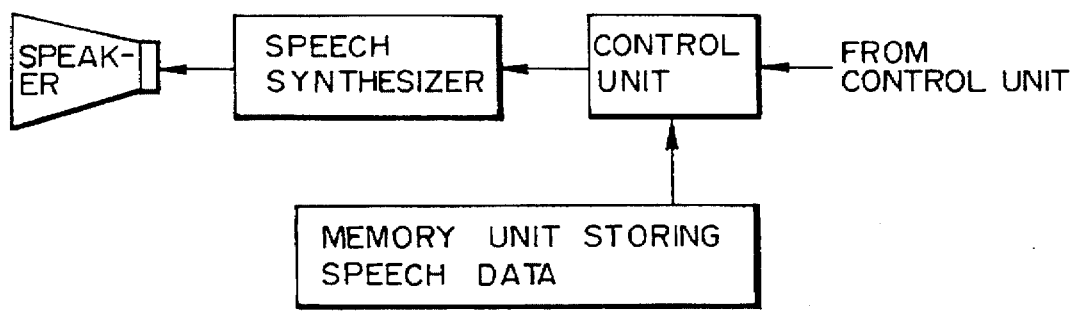
FIG. 9 is a block diagram showing an example of the arrangement of a sound calling unit used in the embodiment of the present invention.

At the same time, the control unit 4a sends information indicating that the name of the callee 10 and the incoming call are received to a signboard unit 6a and a calling units 6a and 7a (FIGS. 8 and 9 respectively show examples of the internal arrangements of these units) (step 64 in FIG. 3).

The signboard unit 6a and the sound calling unit 7a notify the callee 10 of the incoming call using a character display by means of LEDs and a sound, respectively.

Calling Operation 2:

If the position of the paging terminal unit 8 is not registered in the memory unit 5a in the radio zone 9, the control unit 4a checks whether the position of the paging terminal unit 8 is registered in the central control unit 11 (step 65 in FIG. 3).

The central control unit 11 refers to the main memory unit 12 to search for the radio zone in which the position of the paging terminal unit 8 is registered (step 66 in FIG. 3).

If the radio zone 9b in which position registration has been performed is present in the main memory unit 12, a signal for calling the paging terminal unit 8 is sent to the control unit 4b in the radio zone (step 67 in FIG. 3).

The control unit 4b calls the paging terminal unit 8 through the relay station 3b on the basis of this signal (step 68 in FIG. 3).

At the same time, the control unit 4b notifies the callee 10 via an electric sign unit 6b and a sound calling unit 7b by the same methods describe above that the incoming call is received (step 69 in FIG. 3).

If there is no radio zone in which position registration has been performed, the central control unit 11 notifies the control unit 4a that "the callee 10 is not present in the private area" (step 70 in FIG. 3). The control unit 4a then notifies the mobile telephone terminal 1 via the relay station 3a of the information (step 71-1 in FIG. 3).

The mobile telephone terminal 1 notifies the caller A, via the base station 2, using a sound output means and/or a display output means and the like that "the callee 10 cannot respond to the incoming call" (step 71-2 in FIG. 3). At the same time, the cellular telephone terminal 1 displays information indicating the reception of the incoming call and the time when the call is received on the display unit of the cellular telephone terminal 1.

Calling Operation 3:

Assume that the callee 10 is carrying the paging terminal unit 8 capable of transmitting/receiving information, the mobile telephone terminal 1 is in a called state, and the paging terminal unit 8 is called. In this case, the callee 10 can arbitrarily transfer information indicating whether to respond to this call from the paging terminal unit 8 to the control unit 4b via the relay station 3b (step 81 in FIG. 3).

The information transferred to the control unit 4b is further sent from the control unit 4b to the control unit 4a which is present in the radio zone 4a in which the mobile telephone terminal 1 is present (step 82 in FIG. 3). The control unit 4a transfers the information to the mobile telephone terminal 1 via the relay station 3a (step 83 in FIG. 3).

Upon reception of information indicating that the incoming call can be responded from the callee 10, the mobile telephone terminal 1 notifies the caller A via the base station 2 that "the callee can respond to the incoming call and hence wants the caller to wait" (step 84 in FIG. 3).

Upon reception of information indicating that the incoming call cannot be received from the callee 10, the mobile telephone terminal 1 notifies the caller A, via the base station 2, using the sound output means and/or the display output means or the like that "the callee 10 cannot answer the call" (step 84 in FIG. 3). At the same time, the mobile telephone terminal 1 displays information indicating the reception of the incoming call and the time when the call is received on the display unit of the mobile telephone terminal 1.

Calling Operation 4:

Assume that information indicating that the callee can or cannot respond to the incoming call is not transferred to the mobile telephone terminal 1 after the lapse of a predetermined period of time set by the callee 10 in advance. In this case, the mobile telephone terminal 1 notifies the caller A, via the base station 2, using the sound output means and/or the display output means and the like that "the callee 10 cannot answer the call" (step 90 in FIG. 3). At the same time, the mobile telephone terminal 1 displays information indicating the reception of the incoming call and the time at which the call is received on the display unit of the mobile telephone terminal 1.

Figures 10, 11:
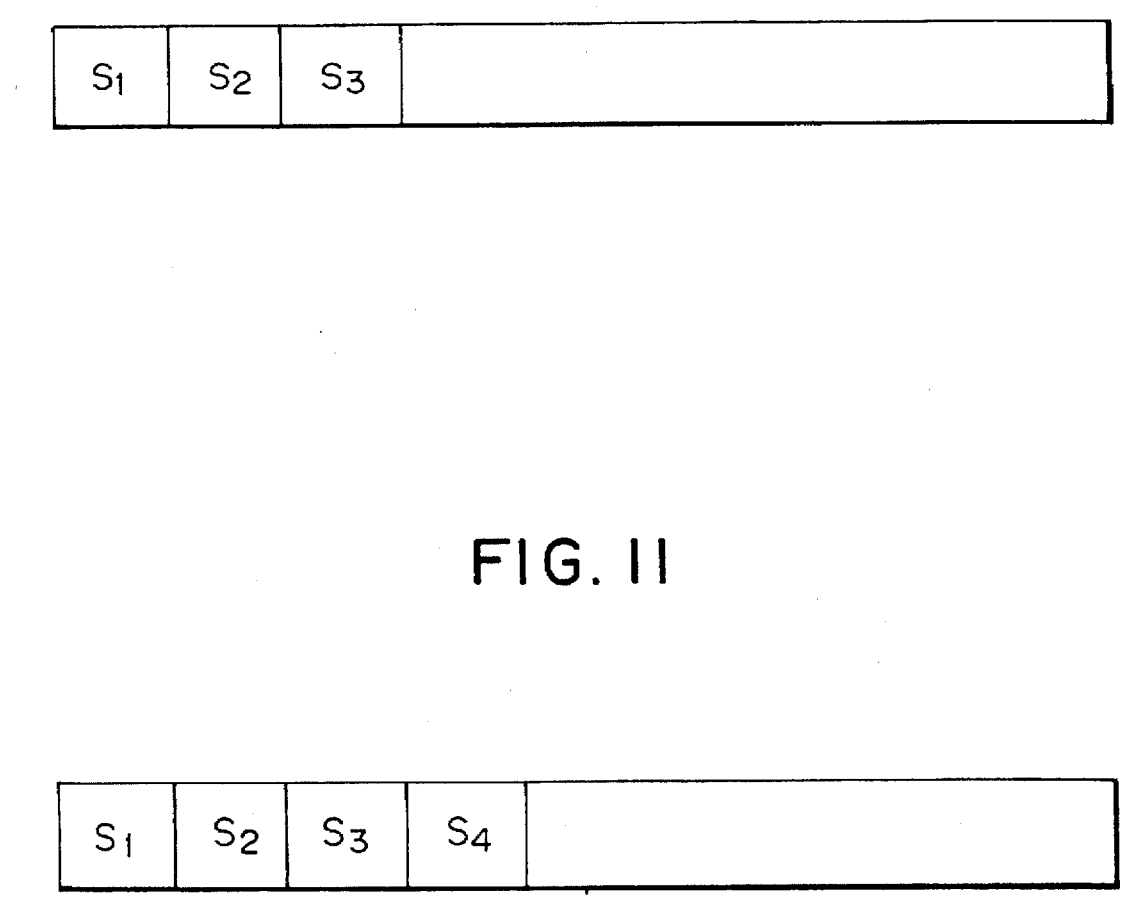

FIG. 10 shows the operation in step 63 in calling operation 1 or the operation in step 68 in calling operation 2, i.e., an example of the signal format associated with a radio signal transmitted from the relay station 3a or 3b to the paging terminal unit 8. In the transmission frame shown in FIG. 10, reference symbol $s_1$ denotes a number unique to the mobile telephone terminal 1; $s_2$, a number unique to the paging unit in a called state, and $s_3$, a number unique to the caller who has made an outgoing call to the mobile telephone terminal 1.

FIG. 11 shows the operation in step 81 in calling operation 3, i.e., an example of the signal format associated with a radio signal transmitted from the paging terminal unit 8 to the relay station 3b. In the transmission frame shown in FIG. 11, reference symbols $s_1$, $s_2$, and $s_3$ denote the same numbers as those in FIG. 10; and $s_4$, a signal for notifying the caller A that the callee can or cannot respond to the incoming call.

Assume that the TDMA (time division multiple access) scheme is used as a communication scheme associated with the above signal format, a speech signal is converted into a digital signal to be transmitted/received, and a modulation scheme is not specified.

The embodiment of the present invention has been described above. As is apparent, however, the present invention is not limited to the above embodiment and may include various other embodiments conforming to the principle of the present invention.

What is claimed is:

1. A calling system using a mobile telephone terminal such as a mobile phone, comprising:

a plurality of radio zones, each including a control unit, a memory unit which cooperates with said control unit, a relay station, and a plurality of calling units, and belonging to a private area as a call range;

a mobile telephone terminal for determining a response disabled state of a callee with respect to an incoming call by measuring a time from generation of a terminating request, and transmitting, via said relay station, information indicating the response disabled state to said control unit arranged in a radio zone in which the terminating request is received;

a central control unit having a main memory unit to control each of said relay stations arranged in said plurality of radio zones via said control unit; and means for notifying information indicating an absence of a callee from said central control unit to said control unit, and/or from said control unit to said mobile telephone terminal via said relay station, and further notifying the information from said mobile telephone terminal to the caller via a base station which has received a terminating request signal from said mobile telephone terminal, wherein position information of said paging terminal unit is sequentially registered in said memory unit, said control unit or said central control unit searches for said paging terminal unit in cooperation with said memory unit or said main memory unit when the callee cannot respond to the incoming call, and when said paging terminal unit is detected, said paging terminal unit is called at a position where said paging terminal unit is detected, and the callee is called via at least one of said calling units which is arranged in the radio zone corresponding to the position where said paging terminal unit is detected.

2. A system according to claim 1, wherein if said paging terminal unit is detected in the radio zone in which said mobile telephone terminal is present when said control unit searches said memory unit, said paging terminal unit is called, and the callee is called via at least one of said calling units which is arranged in the radio zone corresponding to a position where said paging terminal unit is detected.

3. A system according to claim 1, wherein if said paging terminal unit is not detected in the radio zone in which said mobile telephone terminal is present when said control unit searches said memory unit, said central control unit cooperates with said main memory unit to search for another radio zone whose position is registered in said main memory unit, and if another radio zone is detected, said paging terminal unit positioned in said another radio zone is called, and the callee is called via at least one of said calling units which is arranged in said another radio zone.

4. A system according to claim 1, wherein said calling unit is sound calling means and/or signboard display unit.

5. A system according to claim 1, wherein said paging terminal unit comprises means for notifying said mobile telephone terminal of selection information via said relay station and said control unit, the selection information in accordance with selection of the callee which represents whether the callee responds to a terminating request to said mobile telephone terminal.

6. A system according to claim 5, wherein response disabled state information transferred to said mobile telephone terminal via said relay station and said control unit is notified to the caller via said sound output means and/or said display output means.

* * * * *